July 2, 1935.  W. STAHLECKER  2,006,968
TEXTILE SPINDLE MOUNTING
Original Filed Feb. 2, 1932
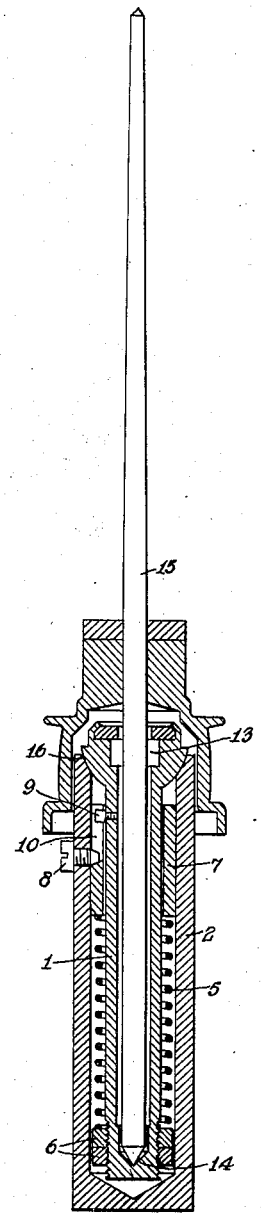
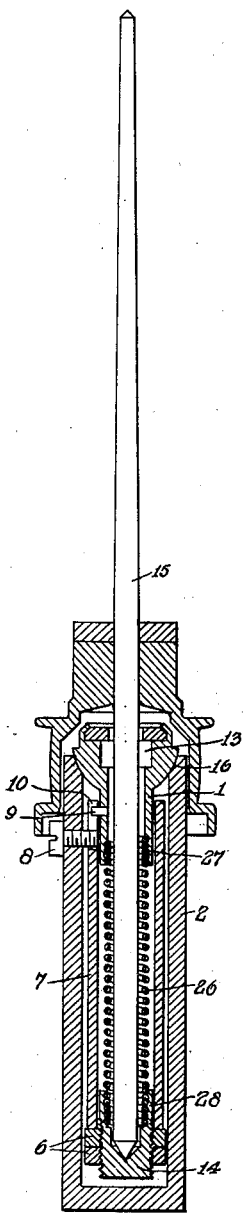
INVENTOR
WILHELM STAHLECKER
BY
ATTORNEY Patented July 2, 1935

2,006,968

UNITED STATES PATENT OFFICE 2,006,968

TEXTILE SPINDLE MOUNTING

Wilhelm Stahlecker, Cannstatt near Stuttgart, Germany, assignor to Vereinigte Kugellagerfabriken Aktiengesellschaft, Schweinfurt, Germany Original application February 2, 1932, Serial No. 590,460, now Patent No. 1,923,123, dated August 22, 1933. Divided and this application July 14, 1933, Serial No. 680,367

4 Claims. (Cl. 308—152)

This application is in the nature of a division of my application, Serial No. 590,460, filed February 2, 1932 for plug and socket connection, which on August 22, 1933 matured into Letters Patent No. 1,923,123.

The invention embodied in this application relates to means for supporting the end of a spindle for textile machinery in such manner that the end of the spindle is supported for rotation in a bolster which is provided with a ball and socket connection permitting it to rock in a casing, an object of the invention being to provide a preloaded spring for holding the ball and socket surfaces normally in connection.

In the drawing accompanying this specification two alternative forms of carrying out the invention are illustrated in which drawing, Figure 1 shows an axial section of the mounting or connecting device supporting the lower end of a textile spindle, which spindle is shown in elevation together with a preloaded compression spring serving to hold the ball and socket members in engagement, and Fig. 2 is a similar view but showing a preloaded tension spring.

Referring first to Figure 1, the bolster 1 is bored axially for the reception of a spindle or blade 15 which is part of a textile machine (not shown). The inner end of the spindle 15 is mounted to rotate in a step bearing 14 at the lower end of the hollow bolster 1. Thirteen is a roller bearing for the spindle at the outer end of the bolster. At about the region of the roller bearing 13 the bolster is provided with a spherical bearing 16 which rests in a hollow spherical bearing seat formed in the upper end of the casing 2.

There is shown mounted to slide on the bolster 1 a clutching sleeve 7. 5 is a compression spring on the bolster which bears on the inner end face of the sleeve with its outer end, and 6 is a double nut on the threaded inner end of the bolster on which the inner end of the spring is abutted. 10 is a slot in the sleeve 7 and 8 is a pin or check in the casing 2, here shown as a screw, which is adapted to enter the slot 10 and to anchor the sleeve 7 on the casing against rotation and axial displacement. Figure 1 shows the final position of the sleeve and the casing in which the inner end of the slot 10 bears on the pin 8. The reaction of the spring 5 acting on the double nut 6 pulls the bolster inwardly and applies the spherical bearing 16 to the bearing seat at the outer end of the casing under a pressure which is determined by the position of the nuts 6 on the threaded end of the bolster 1 and may be regulated by rotating the nuts. The nuts are concealed in the casing 2 after the connection has been assembled, and inaccessible from the outside.

For assembling the bolster and casing a spring 5 is compressed by shifting the sleeve 7 outwardly and rotating the sleeve or the bolster or both so that the lug 9 does not register with the slot 10 in the sleeve. In this condition the bolster and sleeve are inserted in the casing 2. After the pin 8 has been retracted the slot 10 is placed in line with the pin, the bolster with the sleeve is inserted and the pin is screwed home so that it enters the slot 10 and holds the sleeve against rotation with respect to the casing 2. Relative rotation of the casing 2 in which the sleeve takes part and the bolster 1 now brings the lug 9 into registering relation with the slot 10 so that the spring 5 pushes the sleeve 7 outwardly as far as is permitted by the pin 8. The bolster 1 and the casing 2 are now held against axial displacement by the resilient pressure of the spring 5 and also against relative rotation since the pin 8 carried by the casing and the lug 9 on the bolster both engage in the slot 10 of the clutching sleeve 7. When it is desired to remove the bolster from the casing it is merely necessary to retract the pin 8.

The spherical faces forming the connection between the upper part of the bolster and the casing 2 permit a movement of these parts which is induced by an unbalanced load on the blade or spindle 15. The action of the spring produces friction between these parts when they move for dampening the vibrations or oscillations of the blade. The spring exerts no direct tendency to return the blade to normal position but its pressure on the spherical shoulders causes friction which resists any tendency of the blade to depart from normal. Other causes such as gravity and vibration of the parts are relied on to return the blade to normal.

Referring now to Figure 2, this shows a bearing or mounting for a blade 15 which is substantially similar to that illustrated in Figure 1 but modified in certain details because here the compression spring 5 is replaced by a tension spring 26. The bolster 1 is shorter. It extends inwardly only as far as 27 where the outer end of the spring 26 is secured in it. 28 is a sleeve at the outer end of the step bearing 14 in which the other end of the spring 26 is secured. The sleeve 7 is slotted at 10 as described for cooperation with the lug 9 and the pin 8, but extends downwardly as far as the double nut 6 on the step bearing 14.

For assembling the connection the clutching sleeve 7 is shifted on the bolster 1 in the manner described with reference to Figure 2, and the lug 9 and the slot 10 are moved out of aligned relation. The tension of the spring applies the outer end face of the sleeve to the lug 9 on the bolster 1. The bolster and the sleeve are inserted in the casing 2 in the manner described and the sleeve 7 is anchored on the casing by the pin 8. The pull of the spring 26 applies the bottom of the slot 10 to the pin 8 and at the same time holds the spherical seat at the upper end of the sleeve 1 applied to its seating face at the outer end of the casing 2.

Having thus described my invention I claim and desire to secure by Letters Patent:

1. In a plug and socket connection, a hollow plug, a bearing for a spindle in said plug, a socket adapted to receive said plug, spherical seats on said plug and said socket for holding said members against relative axial displacement in a given direction while permitting rocking of said plug in said socket, resilient means for keeping said holding means engaged, and means for loading said resilient means before inserting said plug in said socket.

2. In a textile spindle mounting, the combination with a plug, of a socket adapted to receive said plug, there being spherical seats formed on the plug and socket for holding said members against relative axial displacement in a given direction and for permitting rocking of one member on the other, resilient means for holding said spherical seats in engagement, and means for loading the said resilient means before the insertion of the plug into the socket.

3. In a textile spindle mounting, the combination with a socket having a seat at its outer end, of a plug adapted to enter such socket and having shoulders adapted for cooperative engagement for holding the plug and socket against relative axial displacement in a given direction, a spring for holding said shoulders in engagement, means for loading the spring before the insertion of the plug in the socket, and means for regulating the amount of such load.

4. In a textile spindle mounting, the combination with a plug and socket connection, of a hollow plug, a bearing for a textile spindle blade in said plug, a socket adapted to receive said plug, spherical seats being formed on said plug and socket for holding said members against relative axial displacement in a given direction while permitting rocking of said plug in said socket, resilient means for holding said spherical seats engaged, and means for loading said resilient means before the insertion of said plug in said socket.

WILHELM STAHLECKER.